CARGO HANDLING APPARATUS

Original Filed April 11, 1966 4 Sheets-Sheet 1

INVENTORS
DUANE N. McCARTNEY
VICTOR H. CARDER
HUGH H. SHAW
BY Naylor & Neal
ATTORNEYS

CARGO HANDLING APPARATUS

Original Filed April 11, 1966

INVENTORS
DUANE N. McCARTNEY
VICTOR H. CARDER
HUGH H. SHAW
BY Naylor & Neal
ATTORNEYS

CARGO HANDLING APPARATUS

INVENTORS
DUANE N. McCARTNEY
VICTOR H. CARDER
HUGH H. SHAW
BY Naylor & Neal
ATTORNEYS

CARGO HANDLING APPARATUS

Original Filed April 11, 1966

INVENTORS
DUANE N. McCARTNEY
VICTOR H. CARDER
BY HUGH H. SHAW
Naylor & Neal
ATTORNEYS United States Patent Office 3,489,300

Patented Jan. 13, 1970

3,489,300
CARGO HANDLING APPARATUS

Duane N. McCartney, Pebble Beach, Victor H. Carder, Pacific Grove, and Hugh H. Shaw, Salinas, Calif., assignors to Domino Sugar Company, a corporation of Delaware Original application Apr. 11, 1966, Ser. No. 541,663, now Patent No. 3,435,969. Divided and this application June 12, 1968, Ser. No. 751,323

Int. Cl. B65g 67/02

U.S. Cl. 214—38 2 Claims

ABSTRACT OF THE DISCLOSURE

Apparatus for handling palletized freight including a power driven transporter having longitudinally extending tongues which mate with complementary tongues on pallet supporting trailers. The tongues of the transporter may be moved up and down to engage and disengage the transporter from a load on the trailer, with power driven conveyor means on the transporter tongues for moving pallets onto and off from the trailer. The transporter includes a driver station mounted adjacent to the longitudinally projecting tongues with the station mounted for lateral movement out of the cargo conveying path over the transporter.

This application is a division of our co-pending application Ser. No. 541,663, now Patent No. 3,435,969, filed Apr. 11, 1966, for Cargo Handling Apparatus.

This invention relates to cargo handling apparatus and more particularly to apparatus for handling palletized air freight.

Since the development of jet aircraft specially equipped for transporting air freight, it has become popular to preassemble air freight onto special pallets which may be moved into an aircraft rapidly when an aircraft is available for loading. The preloaded pallets are generally placed in a storage area adjacent to an aircraft loading area, and when an aircraft is available for loading, the pallets are moved from the storage area to a suitable lift which raises the pallets to the cargo hatch of the aircraft.

The preloaded pallets are often very heavy making it desirable to have power operated equipment for moving the pallets to and from the storage area, but because of the large number of pallets stored at a given time, the provision of power operated storage means for each pallet is very expensive.

In accordance with this invention, there is provided new cargo handling equipment for storing palletized freight and moving the freight pallets to and from the storage area and to and from the lift at the aircraft. This new equipment is provided with complete power operating means which permit very heavy pallets to be handled throughout the cargo transferring operation with substantially no manual effort. Additionally, the equipment of this invention may be operated by a single workman.

While the equipment of this invention provides power driving means for transferring pallets to and from a large number of pallet storage stations, all of the power operated elements of the equipment are provided in a single unit so that no power means need be provided in each of the pallet storage devices.

The power operated unit of this equipment is provided with a unique support arrangement for its driver's station whereby the driver is positioned at the loading end of the unit in the path of movement of freight while still permitting freight movement through the location occupied by the driver's station. Additionally, this unique arrangement permits the unit to have a maximum load carrying width with a minimum storage and running width.

Other features and advantages of the invention will become apparent from the following description read in conjunction with the attached drawing in which:

FIG. 7 is another side elevational view similar to FIGS. 3–5 illustrating the manner in which the transporter may be used for moving a loaded pallet onto the elevated surface of a loading dock or the like;

Figure 1:
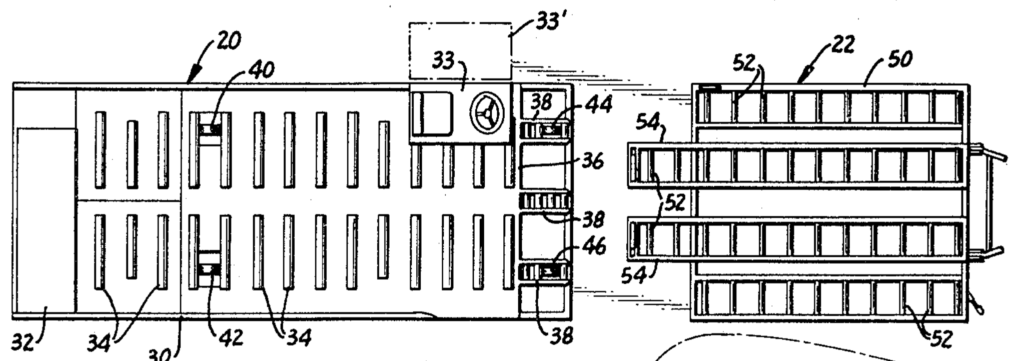
FIG. 1 is a top plan view of two pieces of equipment of this invention, the piece of equipment on the left being a power operated cargo transporter, and the piece of equipment on the right being a pallet storage device in the form of a trailer.
Figure 2:
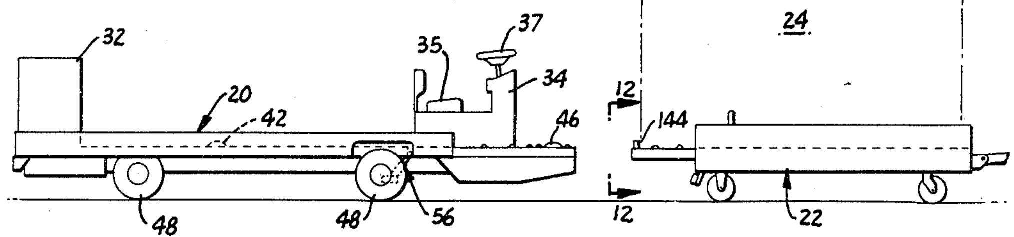
FIG. 2 is a side elevational view of the apparatus of FIG. 1.
Figure 3:
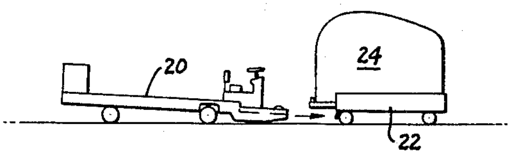
FIGS. 3–5 are side elevational views similar to FIG. 2 illustrating a sequence of operations performed in transferring a loaded pallet from one of the pallet trailers to the transporter.
Figure 4:
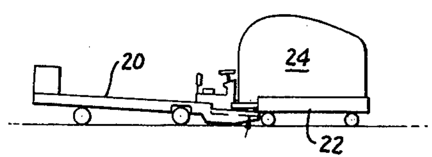
Figure 5:
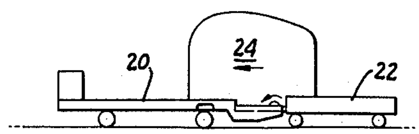
Figure 6:
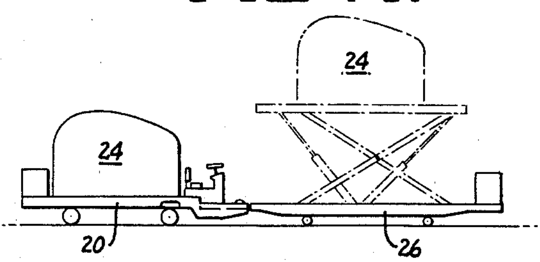
FIG. 6 is a perspective view similar to FIGS. 3–5 illustrating the transfer of a pallet from the transporter to a conventional high lift device by which the pallet is lifted into an aircraft.

Referring now in detail to the drawings, and particularly to FIG. 1, the apparatus of this invention includes a transporter 20 and a pallet storage trailer 22 especially designed and adapted for cooperative interaction with the transporter 20. This apparatus is generally employed in situations where a single transporter 20 is used with a plurality of the trailers 22. Preferably, at least as many trailers 22 will be employed as the number of air freight pallets which are required to fill an aircraft with which the apparatus is used, and under ideal circumstances, the number of trailers 22 will be double the number of pallets used to load an aircraft.

Thus, when the apparatus is used, air freight pallets indicated generally at 24 in FIGS. 2–7 are preloaded with air freight in any convenient manner, and enough of the pallets are preloaded to completely fill an all-cargo jet aircraft.

Each of the preloaded pallets is then placed on one of the trailers 22, and a line of the trailers 22 may be towed by any convenient vehicle to an aircraft loading area for instance on the apron or runway of an airport. Ideally, a second group of unloaded trailers is also transported to the loading area, and the loading area is provided with a lift vehicle such as vehicle 26 in FIG. 6 by which the loaded pallets may be moved between the airport apron and the cargo hatch of an aircraft.

With this cargo handling apparatus thus assembled, cargo can be transferred to and from an aircraft very rapidly thus cutting to a minimum the "turn around time" of the aircraft and permitting maximum use of the extensive cargo carrying aircraft. The apparatus is used for unloading and reloading an aircraft in the following way: preloaded pallets of freight in the cargo hold of the aircraft are lowered to the ground one by one by the lift device 26, and the transporter 20 moves each incoming pallet to one of the empty trailers 22. The incoming pallets may then be removed from the loading area, and the transporter is used to move the outgoing pallets from the trailers 22 to the high lift device 26 where they are transferred sequentially onto the aircraft. As indicated below, the transporter and trailers are so designed that the operation of power means on the transporter may be employed to transfer the loaded pallets to and from the trailers without any manual handling of the load, and the transporter and high lift device may be designed and used in a similar way.

The specific structures of the transporter and trailer are illustrated in FIGS. 1 and 8–13. The transporter has a frame 30 on which is mounted an engine compartment 32 and a driver's station 33. The driver's station 33 has a driver's seat 35, a steering wheel 37, and control means not shown for operating the various power operated devices on the transporter. The bulk of the transporter 20 comprises a load carrying bed on top of the frame 10 provided with anti-friction rollers 34 which facilitate the movement of a loaded pallet onto and off of the transporter. The transporter has a front end 36 provided with three forwardly projecting tongues 38, and four power driven conveyor wheels 40, 42, 44 and 46 are mounted on the transporter projecting above the upper surface of the rollers 34 for driving loaded pallets of freight onto and off of the transporter. The drive rollers 44 and 46 are mounted on the two outboard tongues 38 where these drive rollers may pick up loaded pallets and move them off of the trailers 22 as explained hereinafter, and the distance between the rollers 40 and 42 on the one hand and the rollers 44 and 46 on the other hand is less than the width of one of the pallets 24 so that two of the drive rollers 40–46 will engage a pallet at all times when the pallet is on the transporter.

As explained below, power driving means are provided for the drive rollers 40–46; power driving means are provided for certain of the drive wheels 48 of the transporter, and power means are provided for moving the driver's station 33 from the position illustrated in FIG. 1 to a laterally projected, outboard position 33′ in FIG. 1 where cargo can be moved through the position normally occupied by the driver station. The trailer 22 includes a frame 50 with an upper load supporting surface provided with anti-friction rollers 52 facilitating movement of cargo onto and off of the trailer. The rollers 52 are undriven, and the trailer 22 requires no independent power means of its own. One side of the trailer 22 is provided with a pair of projecting tongues 54 dimensioned and positioned to interfit between the tongues 38 of the transporter, and the transporter is provided with lift means 56 in FIG. 2 which is described in greater detail hereinafter whereby the tongues 38 of the transporter may be moved between positions above and below the level of the conveyor rollers 52 on the trailer 22.

TRANSPORTER CHASSIS

Figure 8:
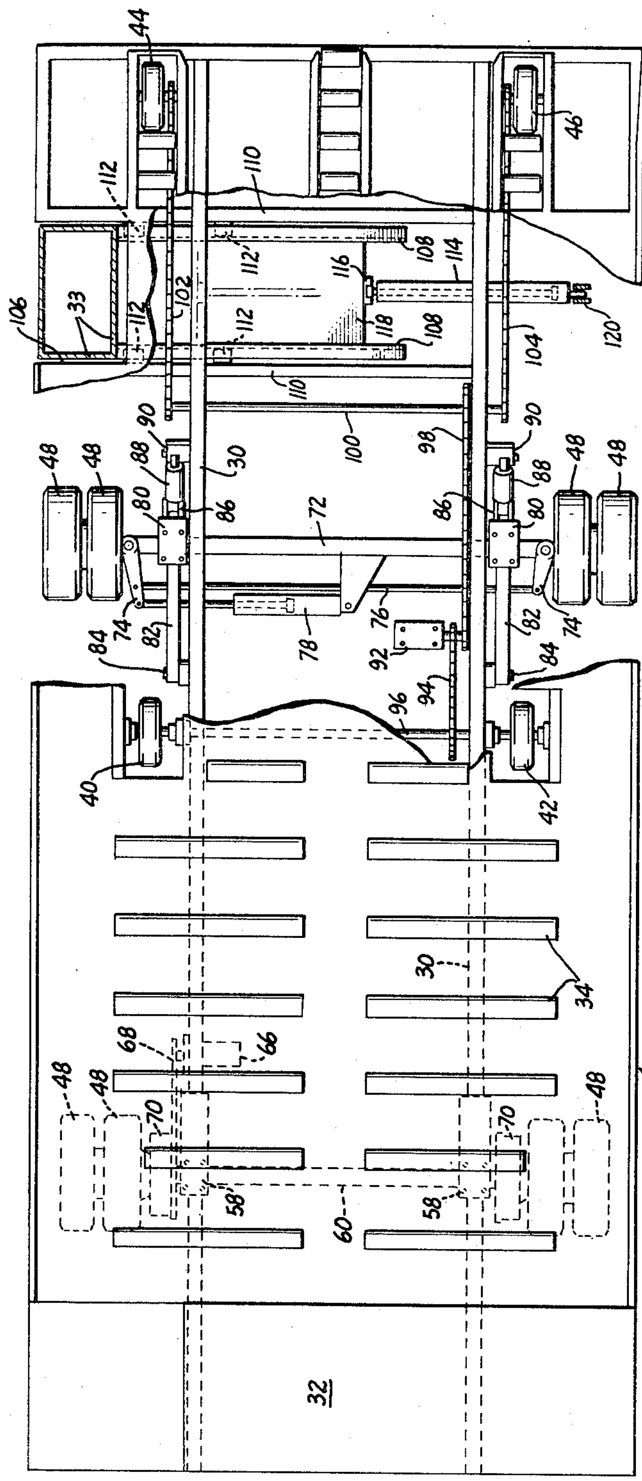
FIG. 8 is a top plan view of the transporter shown in FIG. 1 with FIG. 8 taken on a larger scale and illustrating parts of the transporter broken away.

Referring now in detail to FIG. 8, the main frame members 30 of the transporter comprise a pair of central beams on which are mounted journals 58 supporting rear axle 60 and rear wheels 48. A hydraulic motor 62 is mounted on one of the beams 30 and connected by a chain and sprocket mechanism 68 to the rear axle 60. The engine housing 32 contains a suitable internal combustion engine connected to drive a hydraulic pump which supplies hydraulic fluid to drive the hydraulic motor 66. Conventional brake drums 70 are mounted on the rear axle 60 for stopping the transporter and holding the transporter while cargo was being transferred.

The front wheels 48 are mounted on a front axle 72 connected by conventional steering arms 74, a tie rod 76, and a hydraulic power steering unit 78 by which the front wheels 48 may be steered.

TRANSPORTER LIFT MEANS

A pair of brackets 80 are mounted on the front axle 72 and rigidly connected to a pair of pivot arms 82. The rearward ends of the pivot arms 82 are pivotally connected at pivot pins 84 to the frame members 30, and a bracket 86 is provided on the forward end of each of the arms 82. A hydraulic cylinder 88 is pivotally connected to each of the brackets 86 with the other end of the cylinder pivotally connected to a bracket 90 on one of the frame members 30. The hydraulic cylinders 88 are connected by flexible tubing to control valves on the driver's station 33, and when the control valve is operated, the cylinders 88 may be expanded to lift the frame members 30 upwardly with respect to the front wheels 48 thereby causing the transporter to pivot upwardly about its point of contact between the rear wheels 48 and the ground. The operating stroke of the cylinders 88 is sufficiently great that the frame members 30 may be swung upwardly and downwardly between an elevated position where the drive rollers 44 and 46 project above the conveyor rollers 52 on the trailer and a lowered position where the drive rollers 44 and 46 are retracted below the level of the rollers 52 on the trailer.

CONVEYOR DRIVE MEANS

As indicated above, driving means are provided for rotating the drive rollers 40–46. This driving means comprises a hydraulic motor 92 mounted on the underside of the load carrying bed of the transporter and connected by a chain and sprocket mechanism 94 to a drive axle 96 on which the rollers 40 and 42 are mounted. A second chain and sprocket mechanism 98 connects the axle of the hydraulic motor 92 to a shaft 100 which is in turn connected by chain and sprocket mechanisms 102 and 104 to the axles of the drive rollers 44 and 46 respectively.

The hydraulic motor 92 is connected by flexible conduits to suitable control valves at the driver station by which the hydraulic motor 92 may be driven in forward or reverse to rotate the rollers 40–46 in either direction to transfer cargo under power onto or off of the transporter.

DRIVER STATION PROJECTING MEANS

Figure 9:
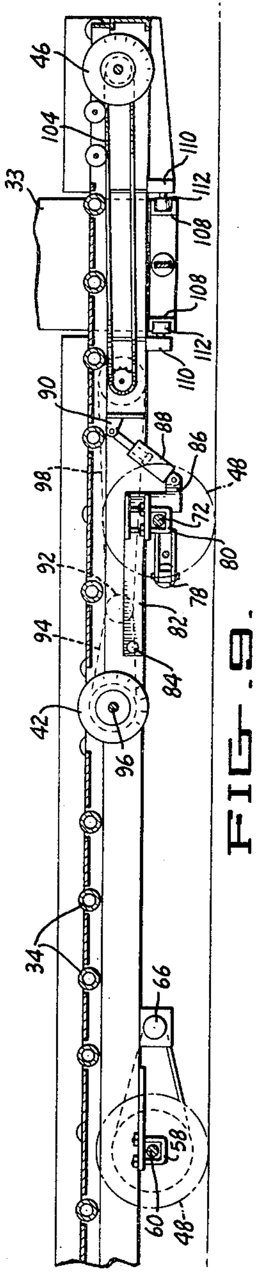
FIG. 9 is a side elevational view partially in section of the apparatus illustrated in FIG. 8.
Figure 10:
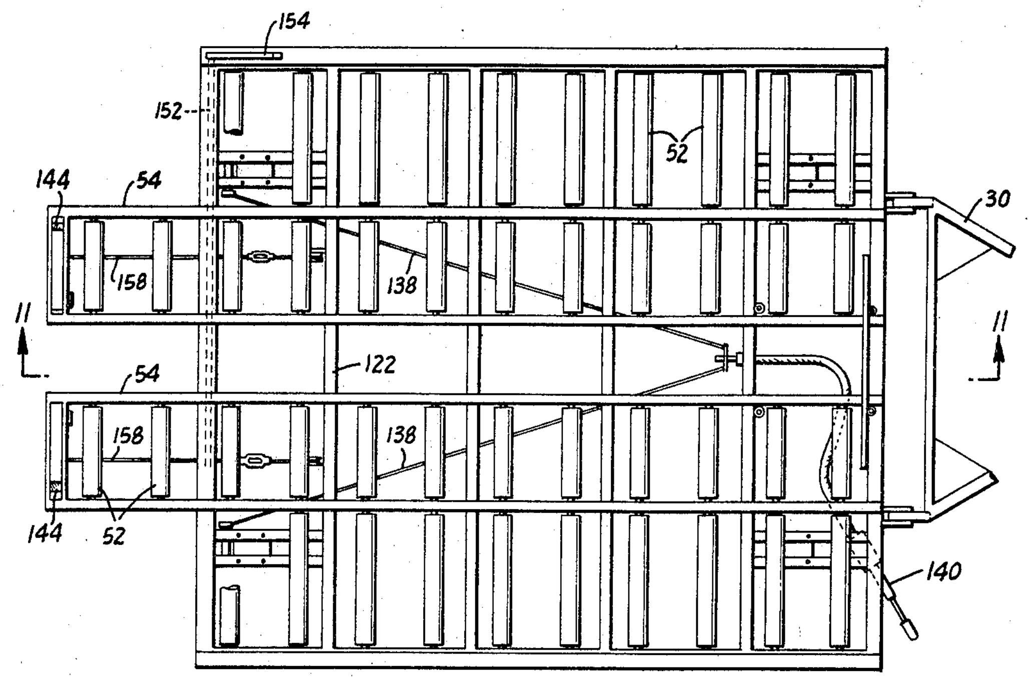
FIG. 10 is a top plan view illustrating the pallet storage trailer of FIG. 1 on a larger scale.
Figure 11:
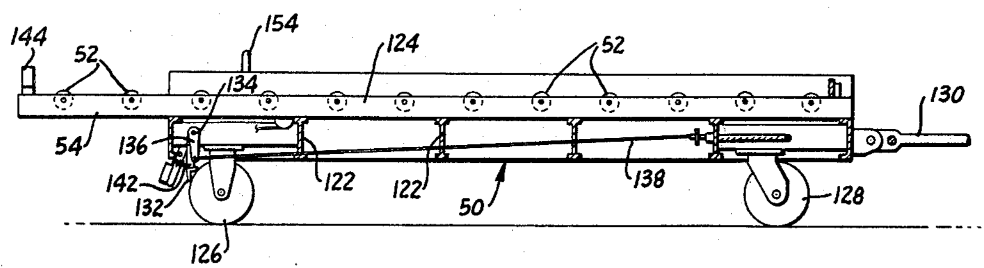
FIG. 11 is a central sectional view of the trailer of FIG. 10.

As illustrated in FIGS. 8 and 9, the lower portion of the driver's station 33 is built in the form of a rectangular frame which is received in a cut out portion 106 of the side of the load carrying bed of the transporter. The rectangular portion of driver's station 33 extends from a position above the conveyor rollers 34 to a position below the conveyor rollers 34 as illustrated in FIG. 9, and a pair of U-shaped channel members 108 are mounted on the rectangular portion of the driver's station 33 below the level of the main frame members 30 of the transporter.

A pair of cross members 110 are mounted between the main frame members 30, and four rollers 112 are mounted on the cross members 110 with two of the rollers 112 projecting into the mouth of each of the channel members 108.

The channel members 108 and the rollers 112 provide adjustable support means by which the driver's station 33 may be projected laterally from the transporter to the position indicated at 33′ in FIG. 1. A hydraulic cylinder 114 is connected at one end to a bracket 116 on a cross member 118 extending between the channel members 108 and connected at its other end to a bracket 120 on the underside of the load carrying bed. The hydraulic cylinder 114 is connected by a suitable flexible conduit to a control valve at the driver's station 33 so that the driver may operate a valve to project the driver's station laterally from the transporter.

The provision of the laterally projecting driver's station 33 in this apparatus has many advantages. In the first place, it permits the transporter to be filled with a minimum storage and running width substantially equal to the width of the pallets which are to be handled by the transporter. At the same time, it permits the transporter to be expanded to a greater width during periods of use when the minimum storage and running width may not be important. Of greater importance, however, the laterally projecting driver's station permits the driver to be located at the front end of the transporter as close as possible to the tongues 34 and 54 which must be brought into registry when the transporter and trailer are brought together. The driver is stationed in this critical area in the actual path of cago movement off of the transporter, yet the driver's station can be moved out of its normal position when cargo is to be moved through its normal position.

THE TRAILER CHASSIS

With reference to FIGS. 10–13, the frame 50 of the trailer is made of a plurality of beams 122 on which are mounted conveyor decking elements 124 rotatably supporting the undriven conveyor rollers 52 of the trailer. The trailer is provided with fixed rear wheels 126 and forward caster wheels 128 and a suitable towing hitch 130. The towing hitch and forward caster wheels 130 and 128 are illustrated as mounted on the end of the trailer opposite to the tongues 54, but they may also be mounted on one of the sides of the trailer as where it may be desirable to tow a plurality of the trailers in a train and unload the trailers from the side of the train without disconnecting them from each other.

The trailer is provided with suitable breaking mechanism including a pair of break shoes pivotally mounted on the frame of the trailer above the rear wheels 126 at pivot shafts 134, and a crank 136 is mounted on each of the pivot shafts 134 connected by a tension cable 138 to suitable break operating means, here illustrated as lever 140 which may be operated to pull the cables 138 to move the break shoes 132 into engagement with the wheels 126. A suitable break release spring 142 (FIG. 11) is connected between the break shoes 132 and the frame of the trailer.

PALLET STOP MEANS

Figure 12:
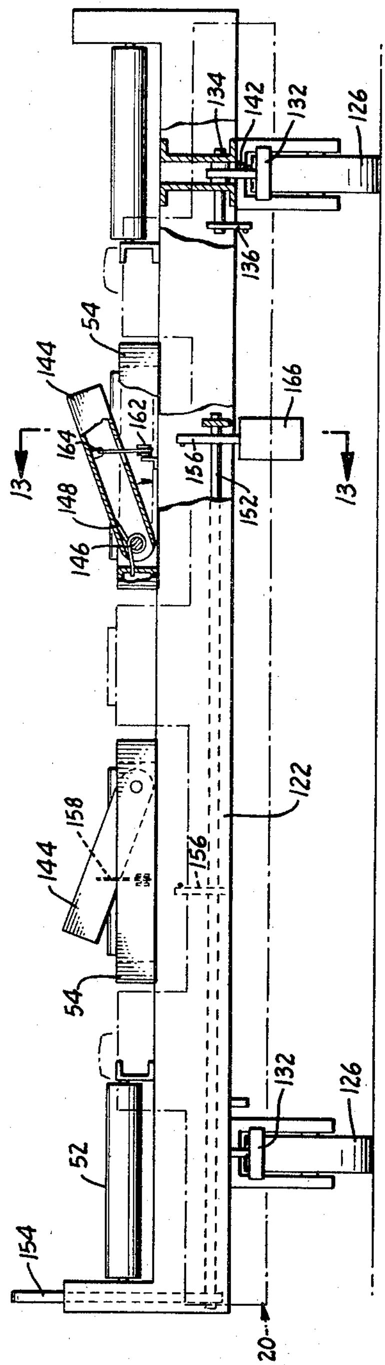
FIG. 12 is an enlarged end view of the trailer of FIG. 11.

The dimensions of the trailer are selected to be substantially equal to the dimensions of the freight pallets which are stored on the trailers so that a pallet mounted on a trailer will be supported primarily by the central portion of the trailer but will project outwardly onto the tongues 54. As indicated above, the pallet is moved onto and off of the trailer over the tongues 54, and releasable stop means are provided on the ends of the tongues 54 for latching a pallet on the trailer when the trailer and transporter are not in interfitting relation. Thus, a latch arm 144 is pivotally mounted in the end of each of the tongues 54 at a pivot pin 146, and a torsion spring 148 is mounted on the pivot pin 146 for resiliently urging the stop members to upwardly projecting positions as illustrated in FIG. 12 where they will block movement of a pallet off of the trailer.

Figure 13:
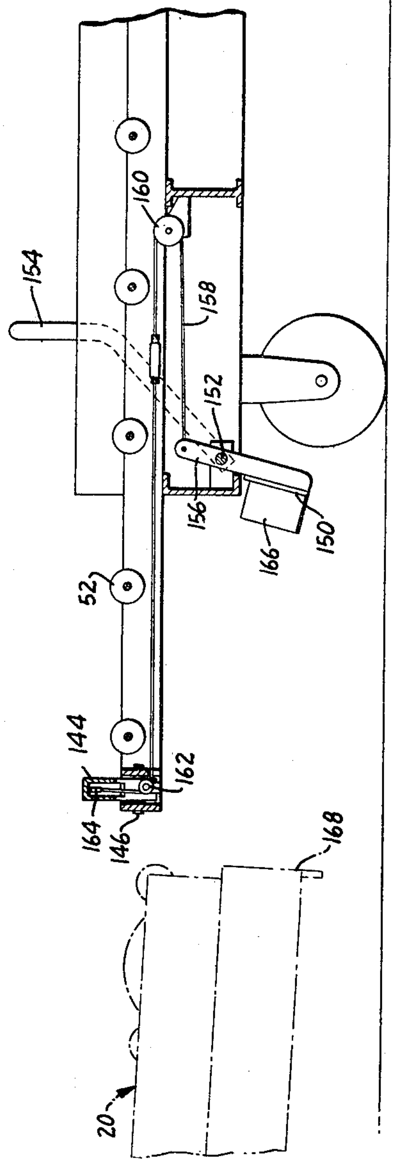
FIG. 13 is a sectional view of the apparatus of FIG. 12 taken along the plane indicated at 13—13.

A stop release arm 150 is pivotally mounted on the frame of the trailer on a pivot shaft 152. A manual release lever 154 is also mounted on the shaft 152, and a torsion spring, not shown, interconnects the lever 154 and the frame of the trailer for resiliently urging the lever 154 and stop release plate 150 to the positions illustrated in FIG. 13. A pair of arms 156 are mounted on the pivot rod 152 and connected by tension cables 158 over pulleys 160 and 162 (FIG. 13) to a clip 164 inside the pallet stop 144 so that counter-clockwise rotation of either the plate 150 or manual release lever 154 in FIG. 13 will effect withdrawal of both of the pallet stops 144 into the tongues 54. As illustrated in FIG. 13, a pad 166 is mounted on the plate 150 positioned to engage the forward end 168 of the transporter frame as the transporter and trailer are moved into interfitting relation. This engagement of the transporter and the pad 166 rotates the plate 150 and pivot shaft 152 to withdraw the pallet stop members 144 into the tongues 54.

OPERATION

Referring again to FIGS. 3–7, the trailer and transporter may be used as follows: starting in an initial condition with a pallet 24 mounted on the trailer 22 and with the driver's station 33 positioned in its inboard location shown in full line in FIG. 1, the control means for the hydraulic cylinders 88 (FIG. 8) are operated to contract the cylinders and lower the front end of the transporter to the position illustrated in FIG. 3. The hydraulic motor 66 is then operated to drive the transporter forward into interfitting relation with the trailer, the tongues 38 on the transporter extending around the tongues 54 on the trailer, and as the trailer and transporter come into interfitting relation the forward end of the trailer contacts the pad 166 (FIG. 13) to release the pallet stop members 144. The driver of the transporter then operates hydraulic cylinder 114 to move the driver's station 33 to its outboard position illustrated at 33' in FIG. 1 and thereby open the path for cargo movement onto the transporter.

Figure 7:
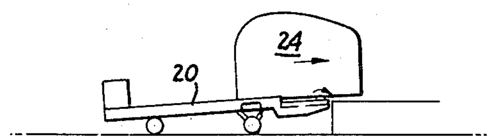

Next the driver expands the hydraulic cylinders 88 (FIG. 8) to lift the forward end of the transporter bringing the drive rollers 44 and 46 into engagement with the underside of the pallet 24 on the trailer. The driver then operates the hydraulic motor 92 (FIG. 8) to rotate the drive wheels 40–46 and transfer the loaded pallet 24 from the trailer to the transporter. The transporter may then be driven away to transfer the pallet to the high lift device 26 (FIG. 6) for a conventional loading block (FIG. 7).

The transfer of a pallet from the transporter to the trailer is accomplished by performing the sequence of steps mentioned above in substantially reverse order with the exception of the fact that the hydraulic motor 92 is operated in reverse to move the pallet off of the transporter instead of on to the transporter and with the exception of the fact that the driver may or may not operate the cylinder 114 to move the driver's station depending upon whether or not the driver has moved the driver's station to its inboard position in front of a pallet on the transporter. In this latter regard, it should be noted that the distance between the driver's station and the engine compartment 32 is slightly greater than the length of the cargo pallet so that the driver's station 33 may be moved to its inboard position in front of a pallet to contract the transporter to its minimum width while the transporter is carrying the pallet.

While certain specific features and advantages of the invention have been illustrated and described in detail herein, it is obvious that many modifications thereof may be made without departing from the spirit and scope of the invention.

We claim:

1. Cargo handling apparatus comprising first and second generally horizontal frames positioned adjacent to each other, power-driven transport means on said first frame for moving said first frame away from said second frame in a predetermined direction, a plurality of elongated and interfitting tongues on said frames parallel to said predetermined direction, conveyor means on said frames and said tongues for conveying cargo back and forth over said frames, said conveyor means including power-driven conveyor means on at least one of said tongues on said first frame, a driver's station on said first frame positioned adjacent to said tongues and above said conveyor means on said first frame, said driver's station including a driver's seat and control means for said power-driven conveyor means, support means mounted on said driver's station and including an elongated support member underneath said conveyor means on said first frame and extending generally perpendicular to said predetermined direction, connecting means on said first frame in engagement with said support member for supporting said elongated support member on said first frame while permitting movement of said support member along its length, and power means for moving said support member along its length for moving said driver's station from said position over said conveyor means to a laterally projected position outside of the vertically projected area of said conveyor means.

2. The apparatus of claim 1 in which said support means comprises a frame portion mounted on said driver's station adjacent to one side of said first frame and extending to a position below said conveyor means and a pair of said elongated support members mounted on said frame portion and extending underneath said conveyor means parallel to each other, and said connecting means includes a pair of rollers in rolling engagement with each of said elongated support members, the rollers of each pair being mounted on said first frame adjacent to said frame portion and at positions spaced apart along the length of said elongated support member.

References Cited

UNITED STATES PATENTS

| | | | |
|---|---|---|---|
| 2,828,027 | 3/1958 | Stevenson et al. | |
| 3,233,761 | 2/1966 | McCartney et al. | 214—84 |
| 3,240,369 | 3/1966 | Kappen. | |
| 3,263,832 | 8/1966 | Williams et al. | |
| 3,298,550 | 1/1967 | Schltiz | 214—505 |
| 3,337,066 | 8/1967 | Reed et al. | |

ROBERT G. SHERIDAN, Primary Examiner